(12) United States Patent
Vasseur et al.

(10) Patent No.: US 9,118,539 B2
(45) Date of Patent: Aug. 25, 2015

(54) MANAGING GREY ZONES OF UNREACHABLE NODES IN COMPUTER NETWORKS

(75) Inventors: Jean-Philippe Vasseur, Saint Martin d'Uriage (FR); Jonathan W. Hui, Belmont, CA (US)

(73) Assignee: Cisco Technology, Inc., San Jose, CA (US)

( * ) Notice: Subject to any disclaimer, the term of this patent is extended or adjusted under 35 U.S.C. 154(b) by 175 days.

(21) Appl. No.: 13/561,985

(22) Filed: Jul. 30, 2012

(65) Prior Publication Data
US 2014/0029610 A1 Jan. 30, 2014

(51) Int. Cl.
*H04L 12/751* (2013.01)
*H04L 12/707* (2013.01)
*H04L 12/703* (2013.01)
*H04L 12/721* (2013.01)

(52) U.S. Cl.
CPC ............ *H04L 45/025* (2013.01); *H04L 45/22* (2013.01); *H04L 45/28* (2013.01); *H04L 45/14* (2013.01)

(58) Field of Classification Search
CPC .................................................. H04L 45/025
USPC .................. 370/217, 221, 238, 338, 389, 392
See application file for complete search history.

(56) References Cited

U.S. PATENT DOCUMENTS

| | | | | |
|---|---|---|---|---|
| 4,987,536 A | * | 1/1991 | Humblet | 709/241 |
| 5,784,557 A | * | 7/1998 | Oprescu | 709/220 |
| 6,105,018 A | * | 8/2000 | Demers et al. | 1/1 |
| 6,522,331 B1 | * | 2/2003 | Danks | 345/473 |
| 6,931,441 B1 | | 8/2005 | Roden et al. | |
| 7,496,650 B1 | * | 2/2009 | Previdi et al. | 709/223 |
| 7,656,857 B2 | | 2/2010 | Thubert et al. | |
| 7,707,307 B2 | * | 4/2010 | Miles et al. | 709/239 |
| 7,860,025 B2 | | 12/2010 | Thubert et al. | |
| 8,018,847 B2 | | 9/2011 | Ramankutty et al. | |
| 8,073,869 B2 | * | 12/2011 | Li et al. | 707/780 |
| 8,238,232 B2 | * | 8/2012 | Bryant et al. | 370/227 |
| 2005/0038774 A1 | * | 2/2005 | Lillibridge et al. | 707/1 |
| 2006/0239211 A1 | * | 10/2006 | Previdi | 370/256 |
| 2007/0230410 A1 | * | 10/2007 | Thubert et al. | 370/338 |
| 2010/0060643 A1 | * | 3/2010 | Kolipaka et al. | 345/440 |
| 2011/0026437 A1 | * | 2/2011 | Roja-Cessa et al. | 370/256 |
| 2011/0080853 A1 | | 4/2011 | Thubert et al. | |
| 2011/0158128 A1 | * | 6/2011 | Bejerano et al. | 370/256 |

(Continued)

OTHER PUBLICATIONS

Winter, et al., "RPL: IPv6 Routing Protocol for Low-Power and Lossy Networks", IETF Trust, Internet Engineering Task Force, RFC 6550, Mar. 2012.
Vasseur, et al.,"Routing Metrics used for Path Calculation in Low Power and Lossy Networks" <draft-ietf-roll-routing-metrics-19>, Mar. 2011.

(Continued)

*Primary Examiner* — Andrew Lai
*Assistant Examiner* — Andrew C Lee
(74) *Attorney, Agent, or Firm* — Parker Ibrahim & Berg LLC; James M. Behmke; Stephen D. LeBarron

(57) ABSTRACT

In one embodiment, a node (e.g., a root-node) of a currently known directed acyclic graph (DAG) topology of a computer network can identify a sub-DAG of one or more nodes that are unreachable. The node can further determine a scope of the unreachable nodes of the sub-DAG and tunnel a redirected message to a reachable node of the DAG topology that is adjacent to at least one of the unreachable nodes of the sub-DAG. The redirected message may cause the reachable node to distribute the redirected message to one or more of the unreachable nodes of the sub-DAG based on the scope.

18 Claims, 10 Drawing Sheets

(56) References Cited

U.S. PATENT DOCUMENTS

| | | | |
|---|---|---|---|
| 2011/0202761 A1* | 8/2011 | Sarela et al. | 713/163 |
| 2011/0211445 A1* | 9/2011 | Chen | 370/221 |
| 2012/0106339 A1* | 5/2012 | Mishra et al. | 370/235 |
| 2012/0221678 A1* | 8/2012 | Tanaka | 709/217 |

OTHER PUBLICATIONS

Thubert, IETF Internet Draft, entitled "Objective Function Zero for the Routing Protocol for Low-Power and Lossy Networks (RPD)" <RFC6552>, Mar. 2012.

O. Gnawali et al., "The Minimum Rank Objective Function with Hysteresis" <draft-ietf-roll-minrank-hysteresis-of-11>, May 2011.

* cited by examiner

MANAGING GREY ZONES OF UNREACHABLE NODES IN COMPUTER NETWORKS

TECHNICAL FIELD

The present disclosure relates generally to computer networks, and, more particularly, to routing techniques for low power and lossy networks (LLNs).

BACKGROUND

Low power and Lossy Networks (LLNs), e.g., sensor networks, have a myriad of applications, such as Smart Grid and Smart Cities. One example routing protocol used for LLNs is a protocol called Routing Protocol for LLNs or "RPL," which is a distance vector routing protocol that builds a Destination Oriented Directed Acyclic Graph (DODAG, or simply DAG) in addition to a set of features to bound the control traffic, support local (and slow) repair, etc. The RPL architecture provides a flexible method by which each node performs DODAG discovery, construction, and maintenance.

Various challenges are presented with LLNs, such as lossy links, low bandwidth, battery operation, low memory and/or processing capability, etc. For example, communication in LLNs can be affected by various communication conditions (e.g., temporal changes in interference, physical obstruction, propagation changes, etc.) that change over time. In addition, time scales of such temporal changes are variable and can range between milliseconds (e.g. transmissions from other transceivers) to months (e.g. seasonal changes of outdoor environment). Accordingly, nodes within the LLN can be potentially unreachable due to the various communication conditions. In particular, detecting these potentially unreachable nodes and re-routing messages destined for the unreachable nodes remains problematic for LLN networks.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
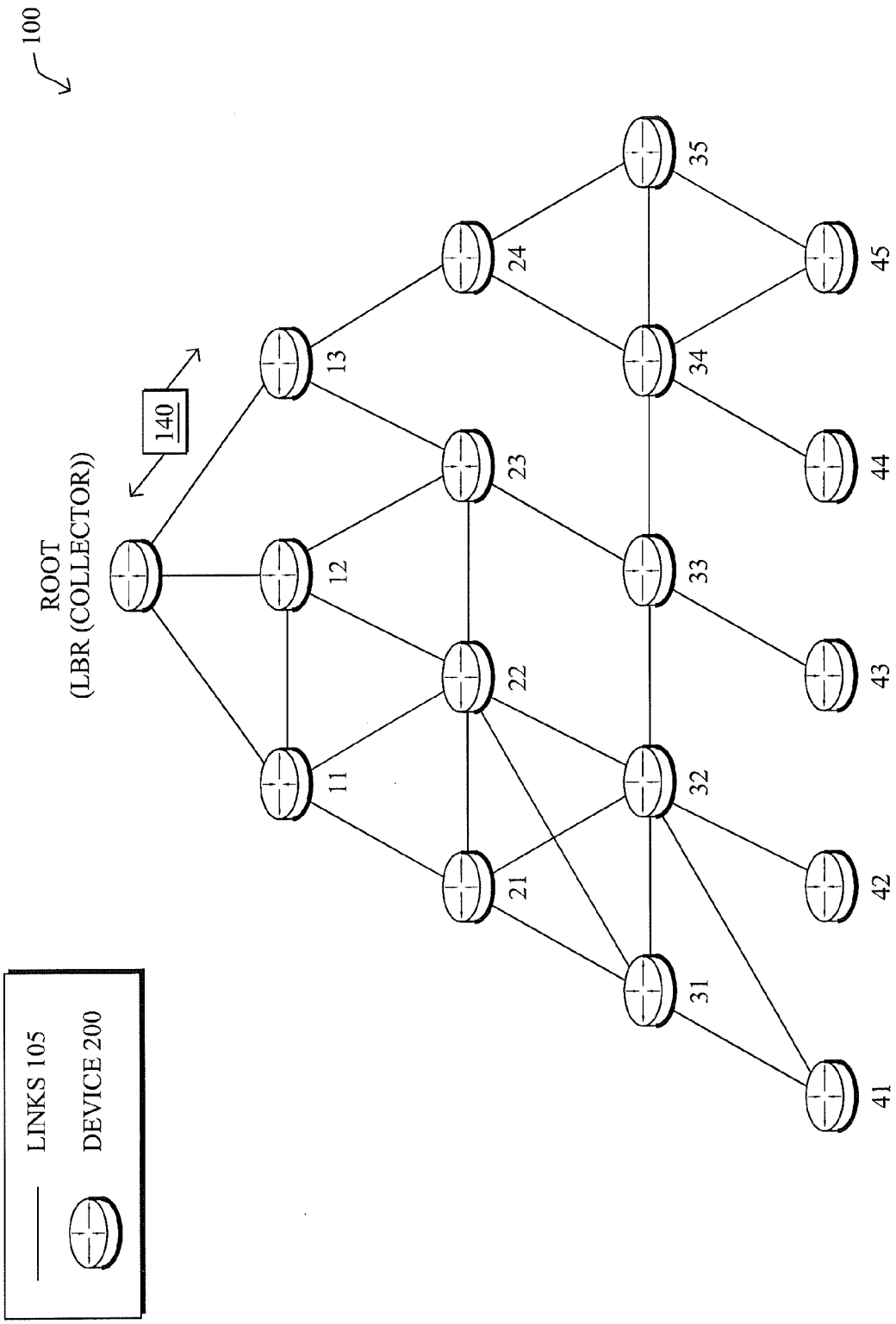
FIG. 1 illustrates an example communication network.

According to one or more embodiments of the disclosure, a node (e.g., a root-node) of a currently known directed acyclic graph (DAG) topology of a computer network can identify a sub-DAG of one or more nodes that are unreachable. The node can further determine a scope of the unreachable nodes of the sub-DAG and tunnel a redirected message to a reachable node of the DAG topology that is adjacent to at least one of the unreachable nodes of the sub-DAG. The redirected message may cause the reachable node to distribute the redirected message to one or more of the unreachable nodes of the sub-DAG based on (e.g., limited by/to) the scope.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC) such as IEEE 61334, IEEE P1901.2, and others. In addition, a Mobile Ad-Hoc Network (MANET) is a kind of wireless ad-hoc network, which is generally considered a self-configuring network of mobile routes (and associated hosts) connected by wireless links, the union of which forms an arbitrary topology.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), etc. Generally, size and cost constraints on smart object nodes (e.g., sensors) result in corresponding constraints on resources such as energy, memory, computational speed and bandwidth.

FIG. 1 is a schematic block diagram of an example computer network 100 illustratively comprising nodes/devices 200 (e.g., labeled as shown, "root," "11," "12," ... "45," and described in FIG. 2 below) interconnected by various methods of communication. For instance, the links 105 may be wired links or shared media (e.g., wireless links, PLC links, etc.) where certain nodes 200, such as, e.g., routers, sensors, computers, etc., may be in communication with other nodes 200, e.g., based on distance, signal strength, current operational status, location, etc. Those skilled in the art will understand that any number of nodes, devices, links, etc. may be used in the computer network, and that the view shown herein is for simplicity. Also, those skilled in the art will further understand that while the network is shown in a certain orientation, particularly with a "root" node, the network 100 is merely an example illustration that is not meant to limit the disclosure.

Data packets 140 (e.g., traffic and/or messages sent between the devices/nodes) may be exchanged among the nodes/devices of the computer network 100 using predefined network communication protocols such as the Transmission Control Protocol/Internet Protocol (TCP/IP), User Datagram Protocol (UDP), Multi-Protocol Label Switching (MPLS), wireless protocols (e.g., IEEE Std. 802.15.4, WiFi, Bluetooth®, etc.), PLC protocols, or other shared-media protocols where appropriate. In this context, a protocol consists of a set of rules defining how the nodes interact with each other.

Figure 2:
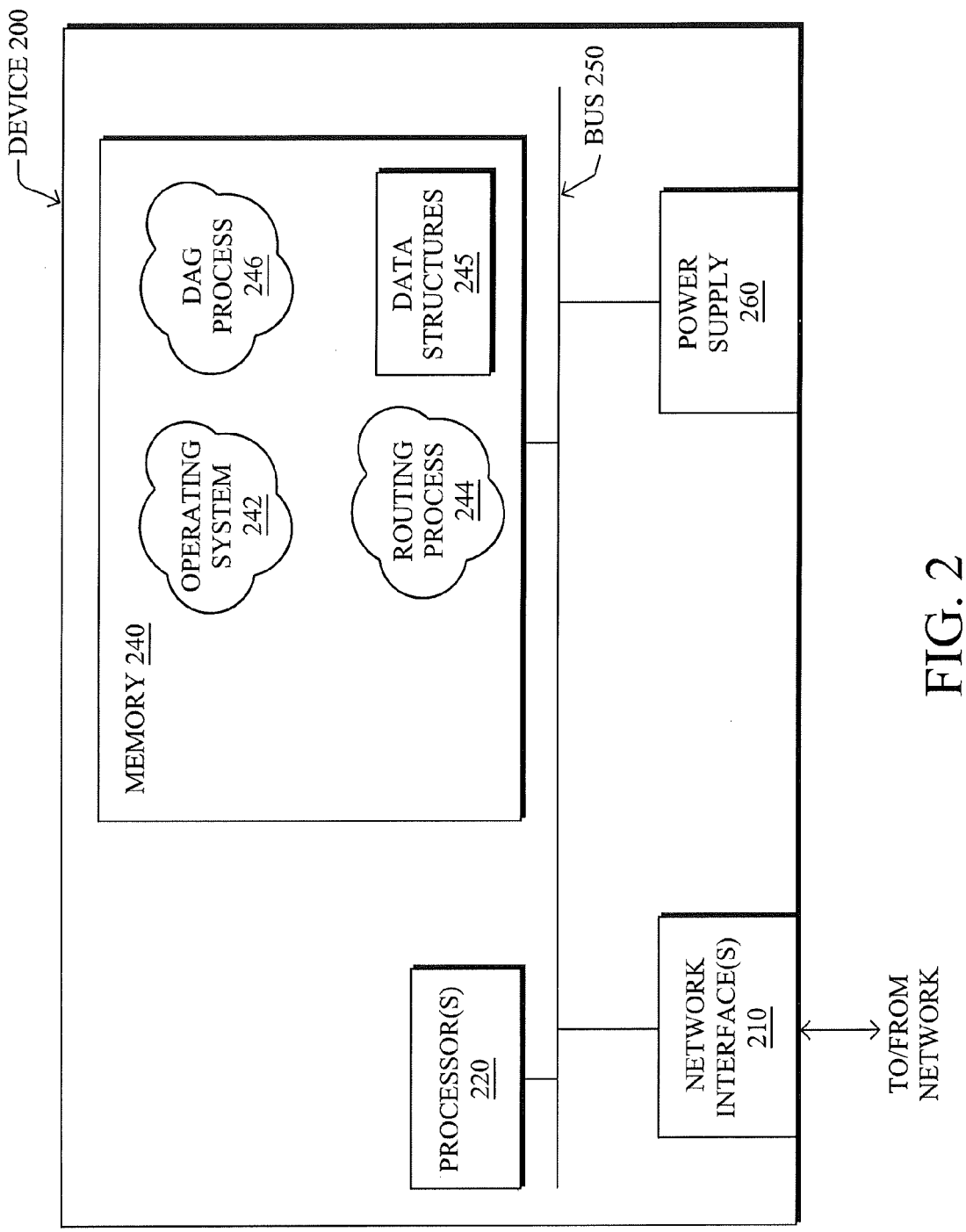
FIG. 2 illustrates an example network device/node.

FIG. 2 is a schematic block diagram of an example node/device 200 that may be used with one or more embodiments described herein, e.g., as any of the nodes shown in FIG. 1 above. The device may comprise one or more network interfaces 210 (e.g., wired, wireless, PLC, etc.), at least one processor 220, and a memory 240 interconnected by a bus 250, as well as a power supply 260 (e.g., battery, plug-in, etc.).

The network interface(s) 210 contain the mechanical, electrical, and signaling circuitry for communicating data over links 105 coupled to the network 100. The network interfaces may be configured to transmit and/or receive data using a variety of different communication protocols. Note, further, that the nodes may have two different types of network connections 210, e.g., wireless and wired/physical connections, and that the view herein is merely for illustration. Also, while the network interface 210 is shown separately from power supply 260, for PLC the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. Note that certain devices may have limited memory or no memory (e.g., no memory for storage other than for programs/processes operating on the device and associated caches). The processor 220 may comprise hardware elements or hardware logic adapted to execute the software programs and manipulate one or more data structures 245 such as routes/prefixes, etc. An operating system 242, portions of which are typically resident in memory 240 and executed by the processor, functionally organizes the device by, inter alia, invoking operations in support of software processes and/or services executing on the device. These software processes and/or services may comprise a routing process/services 244. It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process).

Routing process (services) 244 contains computer executable instructions executed by the processor 220 to perform functions provided by one or more routing protocols, such as proactive or reactive routing protocols as will be understood by those skilled in the art. These functions may, on capable devices, be configured to manage a network topology including routing/forwarding tables (a data structure 245) containing data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

Low power and Lossy Networks (LLNs) (e.g., certain sensor networks), may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid, smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

An example protocol specified in an Internet Engineering Task Force (IETF) Proposed Standard, Request for Comment (RFC) 6550, entitled "RPL: IPv6 Routing Protocol for Low Power and Lossy Networks" by Winter, et al. (March 2012), provides a mechanism that supports multipoint-to-point (MP2P) traffic from devices inside the LLN towards a central control point (e.g., LLN Border Routers (LBRs) or "root nodes/devices" generally), as well as point-to-multipoint (P2MP) traffic from the central control point to the devices inside the LLN (and also point-to-point, or "P2P" traffic). RPL (pronounced "ripple") may generally be described as a distance vector routing protocol that builds a Directed Acyclic Graph (DAG) for use in routing traffic/packets 140, in addition to defining a set of features to bound the control traffic, support repair, etc. Notably, as may be appreciated by those skilled in the art, RPL also supports the concept of Multi-Topology-Routing (MTR), whereby multiple DAGs can be built to carry traffic according to individual requirements.

A DAG is a directed graph having the property that all edges (and/or vertices) are oriented in such a way that no cycles (loops) are supposed to exist. All edges are contained in paths oriented toward and terminating at one or more root nodes (e.g., "clusterheads or "sinks"), often to interconnect the devices of the DAG with a larger infrastructure, such as the Internet, a wide area network, or other domain. In addition, a Destination Oriented DAG (DODAG) is a DAG rooted at a single destination, i.e., at a single DAG root with no outgoing edges. A "parent" of a particular node within a DAG is an immediate successor of the particular node on a path towards the DAG root, such that the parent has a lower "rank" than the particular node itself, where the rank of a node identifies the node's position with respect to a DAG root (e.g., the farther away a node is from a root, the higher is the rank of that node). Further, in certain embodiments, a sibling of a node within a DAG may be defined as any neighboring node which is located at the same rank within a DAG. Note that siblings do not necessarily share a common parent, and routes between siblings are generally not part of a DAG since there is no forward progress (their rank is the same). Note also that a tree is a kind of DAG, where each device/node in the DAG generally has one parent or one preferred parent.

DAGs may generally be built (e.g., by DAG process 246) based on an Objective Function (OF). The role of the Objective Function is generally to specify rules on how to build the DAG (e.g. number of parents, backup parents, etc.). In addition, one or more metrics/constraints may be advertised by the routing protocol to optimize the DAG against. Also, the routing protocol allows for including an optional set of constraints to compute a constrained path, such as if a link or a node does not satisfy a required constraint, it is "pruned" from the candidate list when computing the best path. (Alternatively, the constraints and metrics may be separated from the OF.) Additionally, the routing protocol may include a "goal" that defines a host or set of hosts, such as a host serving as a data collection point, or a gateway providing connectivity to an external infrastructure, where a DAG's primary objective is to have the devices within the DAG be able to reach the goal. In the case where a node is unable to comply with an objective function or does not understand or support the advertised metric, it may be configured to join a DAG as a leaf node. As used herein, the various metrics, constraints, policies, etc., are considered "DAG parameters."

Illustratively, example metrics used to select paths (e.g., preferred parents) may comprise cost, delay, latency, bandwidth, expected transmission count (ETX), etc., while example constraints that may be placed on the route selection may comprise various reliability thresholds, restrictions on battery operation, multipath diversity, bandwidth requirements, transmission types (e.g., wired, wireless, etc.). The OF may provide rules defining the load balancing requirements, such as a number of selected parents (e.g., single parent trees or multi-parent DAGs). Notably, an example for how routing metrics and constraints may be obtained may be found in an IETF Internet Draft, entitled "Routing Metrics used for Path Calculation in Low Power and Lossy Networks" <draft-ietf-roll-routing-metrics-19> by Vasseur, et al. (Mar. 1, 2011 version). Further, an example OF (e.g., a default OF) may be found in an IETF Internet Draft, entitled "RPL Objective Function 0" RFC 6553 by Thubert (March, 2012 version) and "The Minimum Rank Objective Function with Hysteresis" <draft-ietf-roll-minrank-hysteresis-of-04> by O. Gnawali et al. (May 17, 2011 version).

Building a DAG may utilize a discovery mechanism to build a logical representation of the network, and route dissemination to establish state within the network so that routers know how to forward packets toward their ultimate destination. Note that a "router" refers to a device that can forward as well as generate traffic, while a "host" refers to a device that can generate but does not forward traffic. Also, a "leaf" may be used to generally describe a non-router that is connected to a DAG by one or more routers, but cannot itself forward traffic received on the DAG to another router on the DAG. Control messages may be transmitted among the devices within the network for discovery and route dissemination when building a DAG.

According to the illustrative RPL protocol, a DODAG Information Object (DIO) is a type of DAG discovery message that carries information that allows a node to discover a RPL Instance, learn its configuration parameters, select a DODAG parent set, and maintain the upward routing topology. In addition, a Destination Advertisement Object (DAO) is a type of DAG discovery reply message that conveys destination information upwards along the DODAG so that a DODAG root (and other intermediate nodes) can provision downward routes. A DAO message includes prefix information to identify destinations, a capability to record routes in support of source routing, and information to determine the freshness of a particular advertisement. Notably, "upward" or "up" paths are routes that lead in the direction from leaf nodes towards DAG roots, e.g., following the orientation of the edges within the DAG. Conversely, "downward" or "down" paths are routes that lead in the direction from DAG roots towards leaf nodes, e.g., generally going in the opposite direction to the upward messages within the DAG.

Generally, a DAG discovery request (e.g., DIO) message is transmitted from the root device(s) of the DAG downward toward the leaves, informing each successive receiving device how to reach the root device (that is, from where the request is received is generally the direction of the root). Accordingly, a DAG is created in the upward direction toward the root device. The DAG discovery reply (e.g., DAO) may then be returned from the leaves to the root device(s) (unless unnecessary, such as for UP flows only), informing each successive receiving device in the other direction how to reach the leaves for downward routes. Nodes that are capable of maintaining routing state may aggregate routes from DAO messages that they receive before transmitting a DAO message. Nodes that are not capable of maintaining routing state, however, may attach a next-hop parent address. The DAO message is then sent directly to the DODAG root that can in turn build the topology and locally compute downward routes to all nodes in the DODAG. Such nodes are then reachable using source routing techniques over regions of the DAG that are incapable of storing downward routing state. In addition, RPL also specifies a message called the DIS (DODAG Information Solicitation) message that is sent under specific circumstances so as to discover DAG neighbors and join a DAG or restore connectivity.

Figure 3:
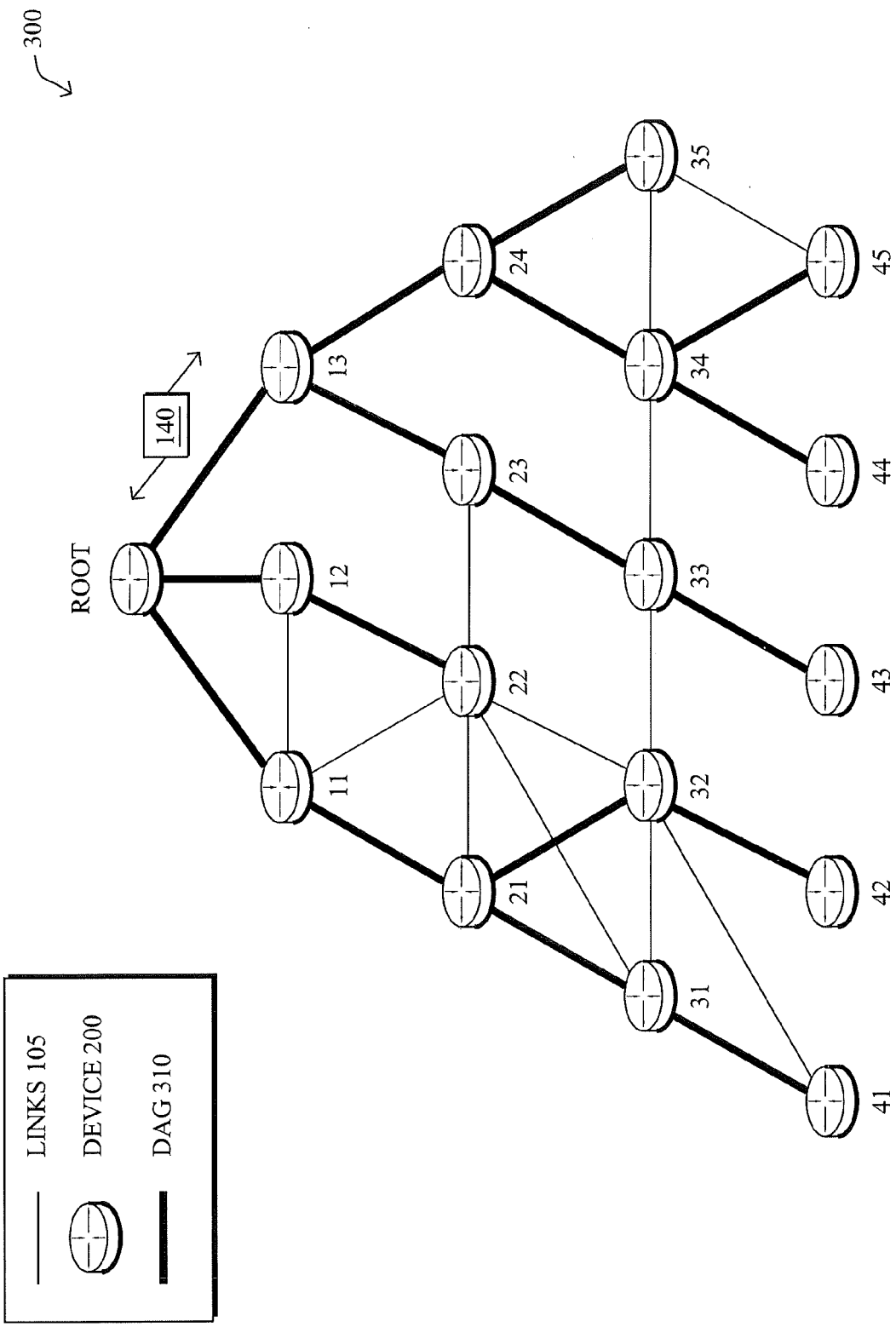
FIG. 3 illustrates an example view of a directed acyclic graph (DAG) topology of the communication network.

FIG. 3 illustrates an example DAG 300 that may be created, e.g., through the techniques described above, within network 100 of FIG. 1. For instance, certain links 105 may be selected for each node to communicate with a particular parent (and thus, in the reverse, to communicate with a child, if one exists). These selected links form the DAG 310 (shown as thicker lines), which extends from the root node toward one or more leaf nodes (nodes without children). Traffic/packets 140 may then traverse DAG 410 in either the upward direction toward the root or downward toward the leaf nodes.

As noted above, nodes within the LLN can be potentially unreachable due to the various communication conditions, and detecting potentially unreachable nodes and re-routing messages destined for the unreachable nodes has been generally problematic in LLN networks. For example, nodes employing the RPL protocol build and maintain DAG routing topology via the DIO messages and the DAO messages, as described above. DAO messages are particularly important to maintain downward routes, and loss of DAO messages can prevent a DAG root node from delivering messages to all nodes within the sub-DAG. That is, downward routes are typically not updated until DAO messages propagate toward the DAG root node. Accordingly, loss of DAO messages, such as due to nodes that become unreachable, can result in a loss of additional messages that are routed according to an outdated DAG topology.

The techniques herein provide a mechanism that maintains and updates connectivity for unreachable nodes (e.g., when DAO messages are lost). In particular, as described herein, the techniques detect and identify the unreachable nodes (e.g., "grey zones") of a sub-DAG (e.g., via ICMP "destination unreachable" packets), determine a scope of the unreachable nodes, and determine an alternate route toward the unreachable nodes (e.g., via alternate paths). Once determined, the techniques provide for tunneling a redirected message to an adjacent node to at least one of the unreachable nodes of the sub-DAG. The redirected message causes the reachable node to distribute the redirected message (e.g., multicast, broadcast) to one or more of unreachable nodes of the sub-DAG. Notably, the redirected message can include various time-to-live (TTL) parameters to further determine a scope of the unreachable nodes of the sub-DAG. Each unreachable node that receives the redirected message can further initiate a new DAO, which allows the DAG root to repair and update the DAG routing topology and eliminate unreachable nodes.

Illustratively, the techniques described herein may be performed by hardware, software, and/or firmware, such as in accordance with DAG process 246, which may contain computer executable instructions executed by the processor 220 to perform functions relating to the techniques described herein, e.g., in conjunction with routing process 244. For example, the techniques herein may be treated as extensions to conventional protocols, such as the RPL protocol, and as such, would be processed by similar components understood in the art that execute the RPL protocol, accordingly.

Figure 4:
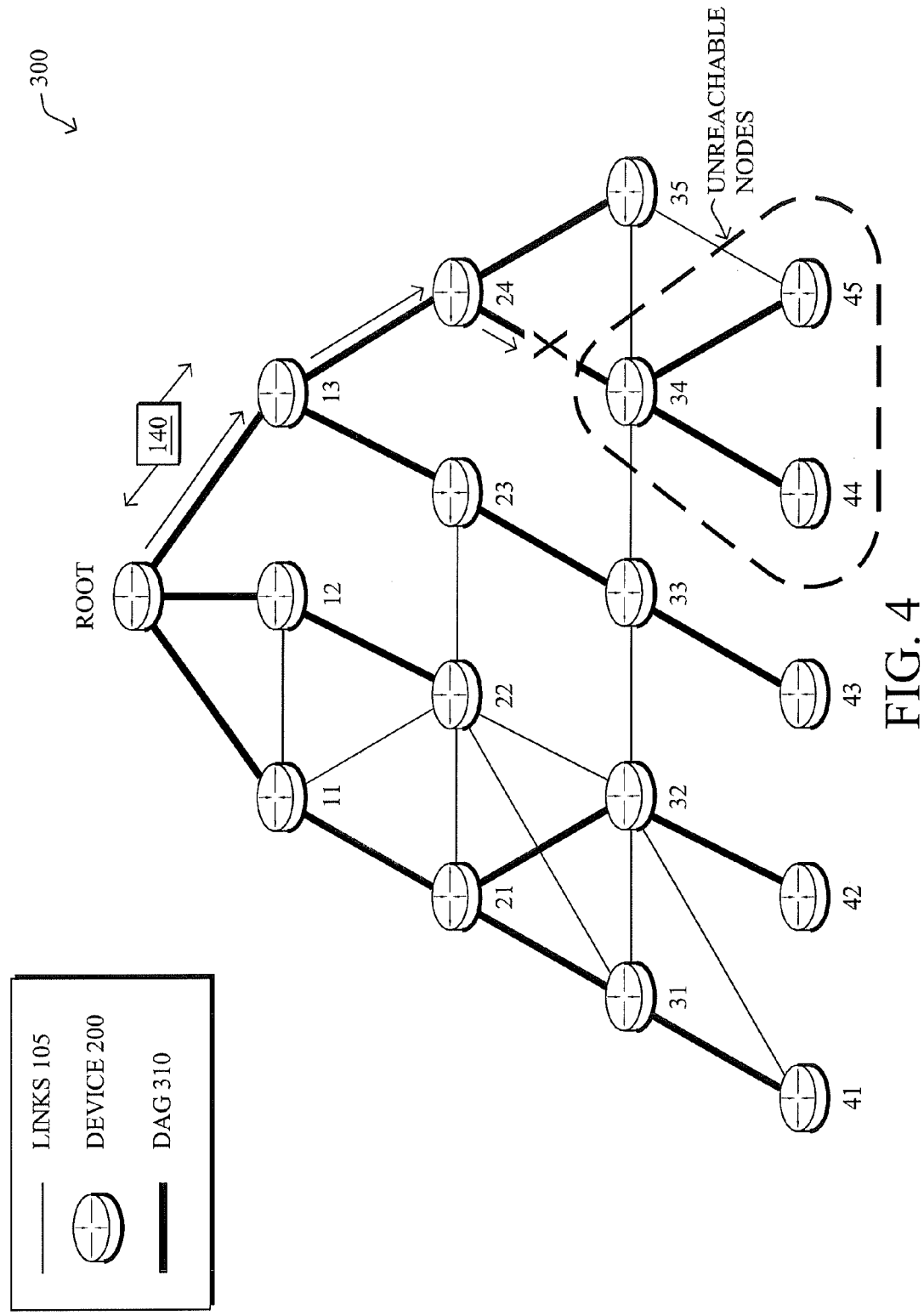
FIGS. 4-7 illustrate an example process for re-routing messages to reach unreachable nodes of a sub-DAG.

FIGS. 4-7 illustrate a progression of an example re-routing process to redirect messages to reach unreachable nodes of a sub-DAG. In particular, FIG. 4 illustrates a sub-DAG of unreachable nodes (e.g. "a grey zone"). Grey zones (or areas) exist where there is a lack of proper routing information to properly forward messages (e.g., data packets) even though there may be a feasible underlying path. For example, as discussed above, a grey zone may appear if a DAO message is lost when a node attempts to report a new DAG parent due to a damaged link or path to an old DAG parent. In this instance, the DAG root may continue to use the broken route for the node and any node in its sub-DAG. As shown, a DAO message from node 34 is lost, which may cause nodes 34, 44, and 45 to become unreachable since the DAG root will continue to use link 24-34 to deliver messages. Although connectivity to 34 and 45 may be restored if the lost DAO message with the updated parent route is eventually delivered to the DAG root, the network must make a tradeoff between sending DAO messages more frequently and incurring to much control message overhead. Importantly, nodes 34, 44, and 45 are unreachable due to a lost DAO message, however; nodes 34 and 45 have links to other neighbor or adjacent nodes (e.g., nodes 33 and 35). Accordingly, nodes 34 and 45 may become reachable if the DAG root uses a different route or path.

Still referring to FIG. 4, one or more of the nodes of a sub-DAG (e.g., nodes 34, 44, and 45) may be identified as unreachable. For example, a parent node (e.g., node 24) may generate a number of error messages (e.g., internet message control protocol (ICMP) destination unreachable messages, etc.) for messages destined for a particular child-node (whether independent messages or retransmissions of messages) and returns the error messages to the DAG root (or other source of the message).

In one embodiment, the DAG root may buffer each packet for a limited period of time for retransmission when ICMP errors are received. In another embodiment, the DAG root relies on the source of the message to implement its own retry mechanism. In this instance, the DAG root may determine retransmitted packets by performing Deep Packet Inspection (DPI) or by caching identifiers (e.g. hashes) of the packets. The DAG root may then compare the number of errors/retransmissions against a threshold count. Once the threshold count is exceeded, the child-node (e.g., the next hop node of node 24), including any sub-nodes connected thereto, can be identified as unreachable. As shown, the unreachable nodes illustratively comprise a sub-DAG rooted at node 34 and including nodes 44 and 45. In this fashion, nodes 44 and 45 share a sub-root or parent node 34 and the scope of the unreachable nodes can be determined based on the DAG topology of the sub-root node 34. In some embodiments, the DAG root can solicit additional information via active probing for particular unreachable nodes, such as determining the scope of unreachable nodes via sending connectivity verification messages (e.g., ICMP echo messages) to one or more nodes within the sub-DAG.

Figure 5:
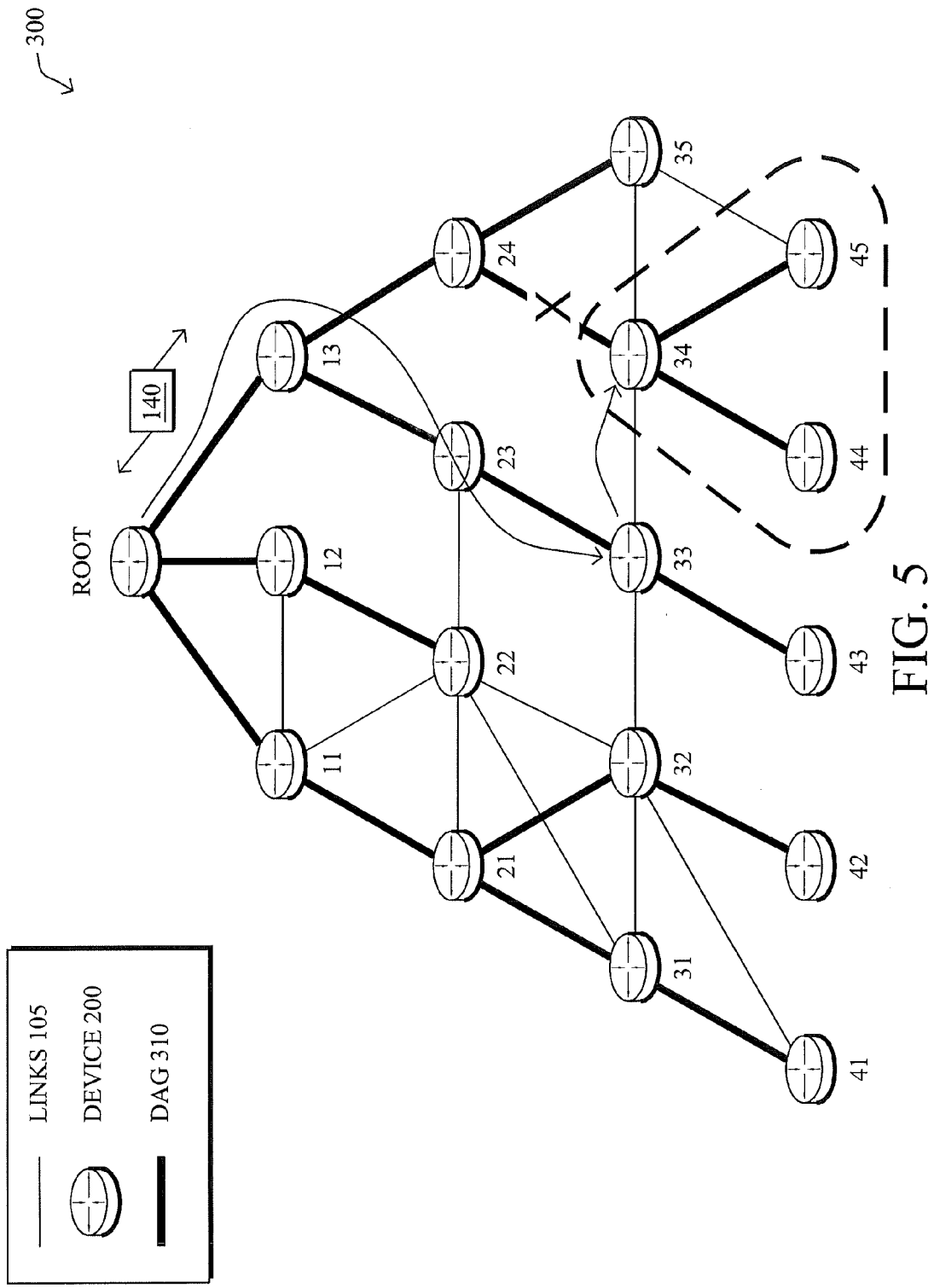

According to the techniques described herein, the DAG root (or other configured device) may attempt to reach nodes within a grey zone of unreachable nodes by sending messages toward nodes "close to" (e.g., adjacent to) the grey zone, in hopes that the adjacent nodes may provide connectivity to one or more grey zone nodes without relying on the outdated routing topology. In particular, as shown in FIG. 5, messages or packets destined for the one or more of the unreachable nodes of the sub-DAG can be redirected via tunneling, that is, encapsulating a redirected message and tunneling the redirected message (e.g., a control message or a data message) destined for one or more of the unreachable nodes to an adjacent node (e.g., node 33). (Note that "adjacent" need not limit the selection of the node to one linked to a grey zone node, but to one that may reach the grey zone via a limited number of hops.)

The adjacent node 33 may thus receive the redirected message and distributes or transmits (e.g., multicast, broadcast, etc.) the redirected message toward the one or more unreachable nodes—here the redirected message may reach sub-root node 34 through the distribution. Note that through the nature of a distributed message, other nodes may also receive and further distribute the message, as will be understood by those skilled in the art. According to one or more embodiments herein, adjacent node 33 can distribute the message in a limited fashion according to the determined scope of the unreachable nodes of the sub-DAG (the grey zone). For example, adjacent node 33 may be instructed to limit the number of next hops for the redirected message via a time-to-live (TTL) parameter within the message that was tunneled by the root node.

Figure 6:
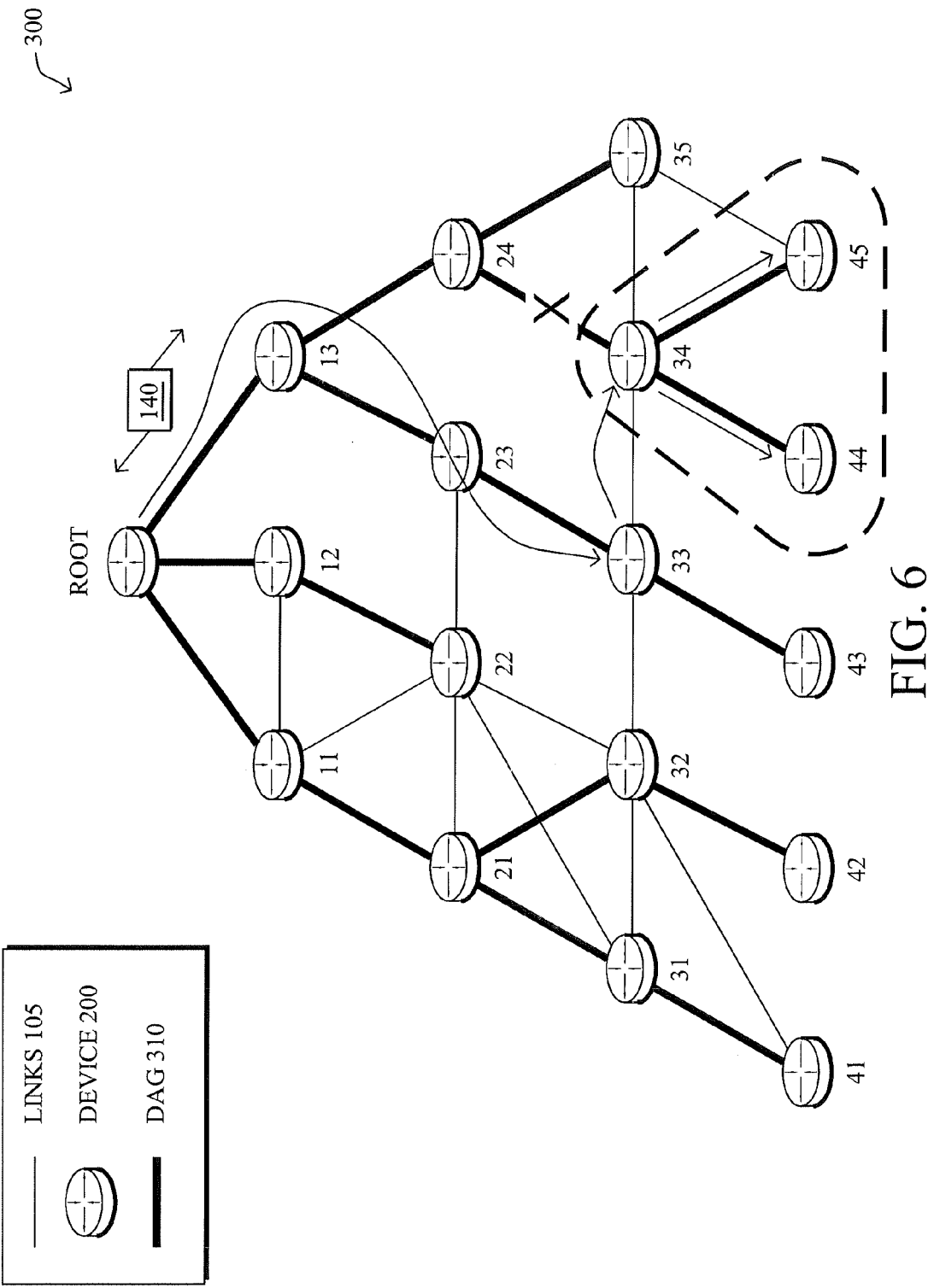
Figure 7:
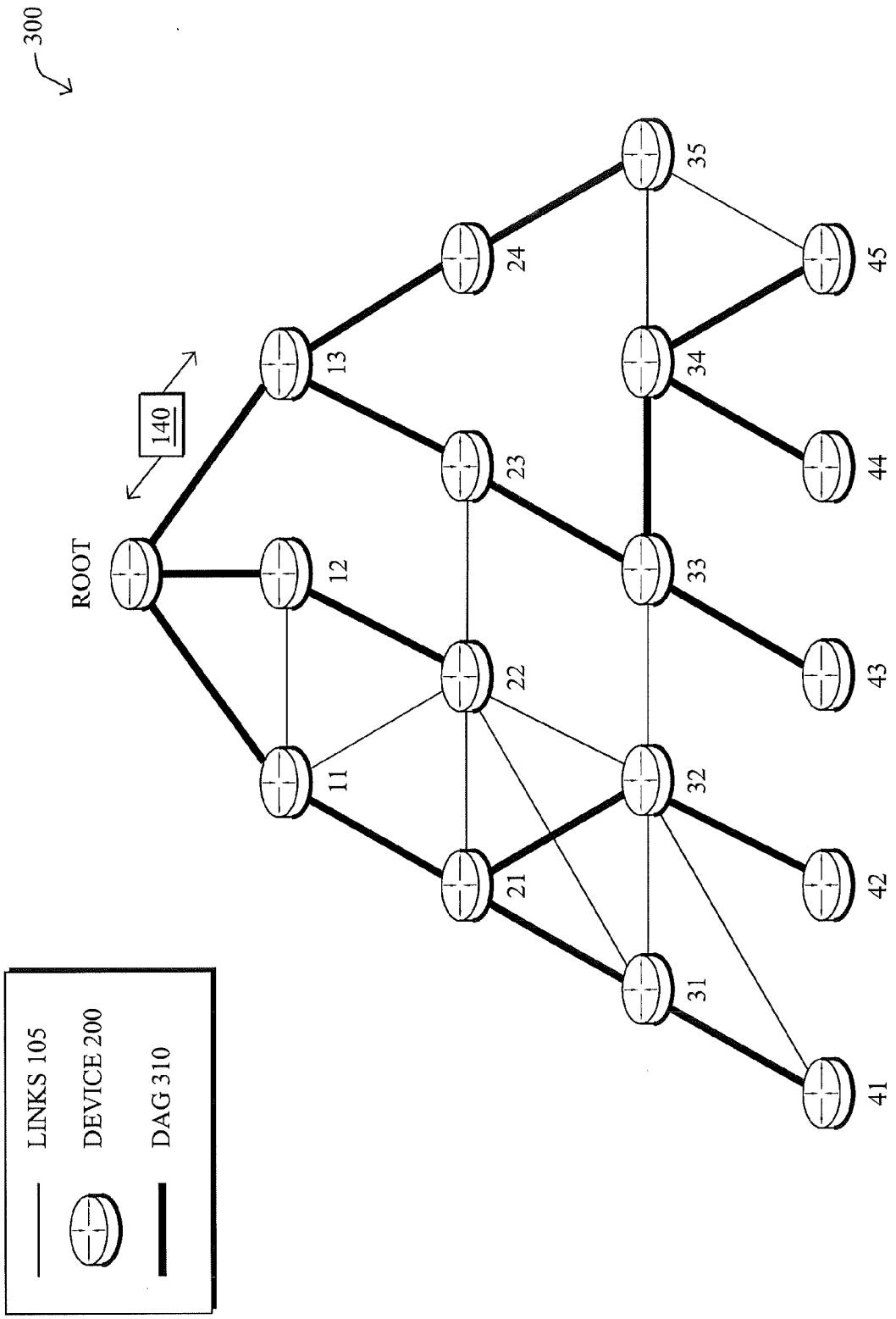

FIG. 6 illustrates an unreachable sub-root node (i.e., a root of a sub-DAG, e.g., node 34) receiving the redirected message and distributing the redirected message to respective sub-nodes—nodes 44 and 45. When the redirected message reaches an intended destination, the destination node consumes the packet and refreshes or updates a respective DAO. The updated DAO is propagated to the DAG root, which then updates the DAG topology, thus removing the unreachable node from the grey zone. For example, FIG. 7 illustrates an updated DAG topology (e.g., network 700) showing node 33 connecting to node 34 via an updated DAG route (e.g., where link 34-24 is unavailable).

Collectively FIGS. 4-7 illustrate identifying one or more unreachable nodes of a sub-DAG having a sub-DAG root node 34, identifying an adjacent node 33 of at least one of the unreachable nodes, encapsulating a redirected message in a tunnel destined for an unreachable node, receiving the redirected message at the adjacent node and transmitting the redirected message to all reachable nodes relative to the adjacent node (including the previously unreachable node 34). In turn, sub-DAG root node 34 receives the redirected message and distributes the redirected message to intended destination(s)—nodes 44 and 45.

As discussed above, the redirected message can include a time-to-live parameter, which determines a number of next hop transmissions, that is, how far a distributed message will reach. In the event the limited scope of the grey zone was not sufficient to reach the intended target (e.g., the TTL was too small), then additional redirected messages having an increased scope (e.g., a larger TTL parameter) can be sent. For example, as a redirected message fails to reach the intended destination, error messages are generated. These error messages can indicate a scope and size of the unreachable nodes. In some embodiments, the TTL prevents consumption of network resources and provides granular control. For example, if the TTL parameter of a redirected message increases beyond a threshold, the DAG root can send subsequent redirected messages to a different adjacent node in an attempt to reach a destination node.

Moreover, in some embodiments, an alternate parent route within the DAG topology can be determined for the unreachable nodes according to an RPL alternate route. That is, the DAG topology can be updated to restore reachability to nodes having alternate routes prior to (or in addition to) redirected messages. DAO messages can include a node's backup parent(s) in addition to its primary parent. Accordingly, the DAG Root may already know of alternate paths to reach a device. In this fashion, the DAG Root can update its routing table by changing node 45's preferred parent to node 35. Note that by addressing nodes within the sub-DAG, the DAG Root can proactively restore connectivity to certain (or even all) nodes before even attempting to send a message to those nodes and reacting to destination unreachable messages. Any node that the DAG Root can proactively restore connectivity to may thus be removed from the grey zone, potentially limiting the scope of distributed messages.

Figure 8:
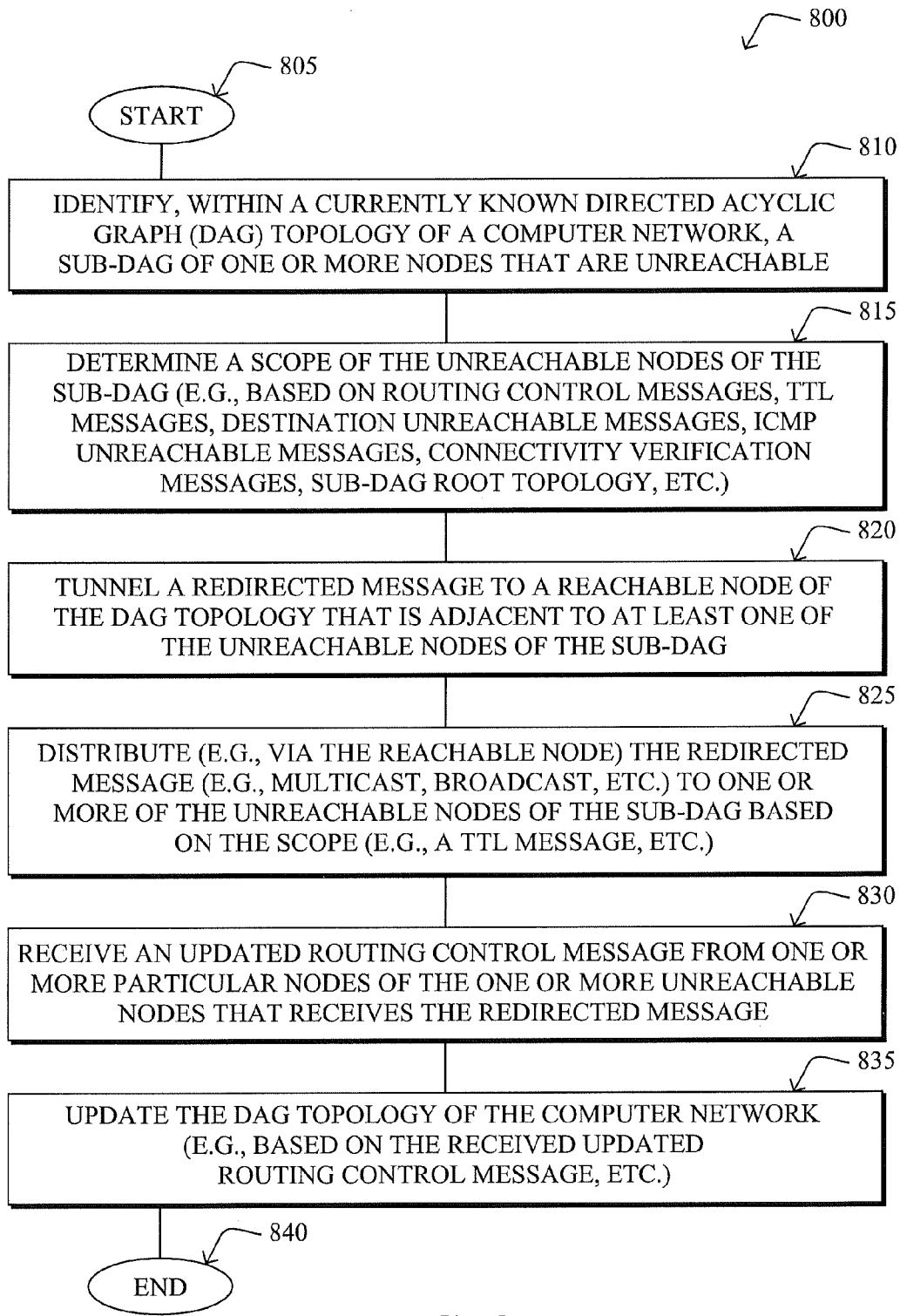
FIG. 8 illustrates an example simplified procedure for reaching unreachable nodes of a sub-DAG in a communication network.

FIG. 8 illustrates an example simplified procedure 800 for reaching unreachable nodes of a sub-DAG in a communication network (e.g., a grey zone). The procedure 800 starts at step 805, and continues to step 810, where, as described in greater detail above, a DAG root node can identify a sub-DAG of one or more unreachable nodes. Upon identifying the unreachable nodes of a grey zone, in step 815, a scope of the unreachable nodes of the sub-DAG can be determined. For example, the scope can be determined based on routing control messages, connectivity verification messages, a sub-DAG root topology, etc.

Once the scope of the grey zone is determined, then in step 820, the DAG-root device may tunnel a redirected message to a reachable node of the DAG topology that is adjacent to at least one of the unreachable nodes of the sub-DAG. For example, as discussed above, the redirected message can be encapsulated and tunneled to an adjacent or neighboring node. The reachable adjacent node may then distribute (e.g., multicasts, broadcasts, etc.) the redirected message to one or more of the unreachable nodes of the sub-DAG in step 825 in hopes of reaching the intended destination nodes. As discussed above, the redirected message can be distributed in a limited or controlled fashion, which can be based on, for example, the scope of the sub-DAG (e.g., via a TTL field within the message, etc.). When the redirected message is received at an intended destination, the intended destination may then provide updated routing information, such as an updated DAO as described above.

Accordingly, in step 830, the DAG root device can receive an updated routing control message (e.g., a DAO), from one or more particular nodes (e.g., the intended destination node(s)), of the unreachable sub-DAG. In response, in step 835 the DAG-root can update the DAG topology for the network (e.g., based on the received updated routing control message). The procedure 800 illustratively ends at step 840.

Figure 9:
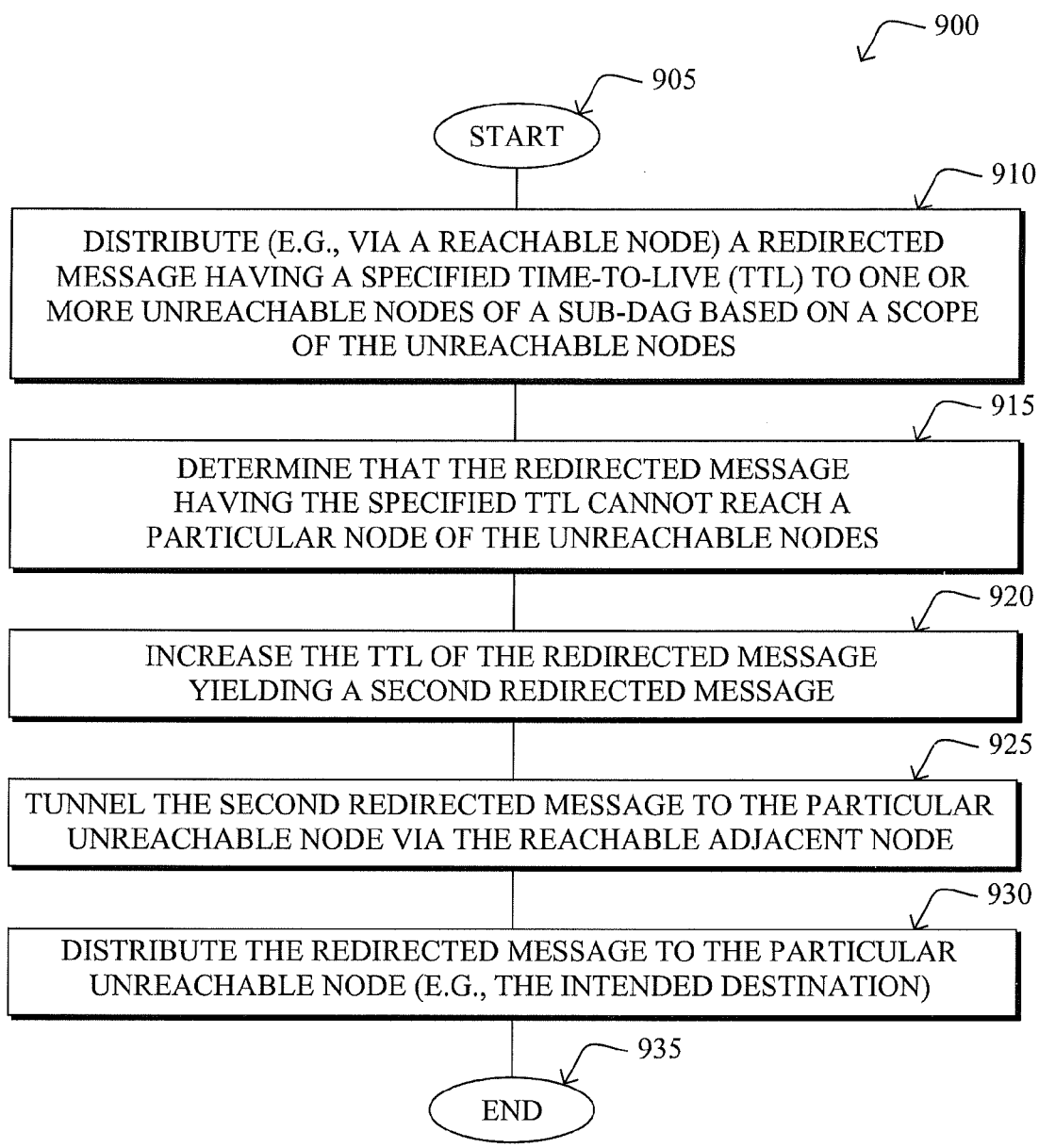
FIGS. 9-10 illustrate example sub-procedures for reaching unreachable nodes of the sub-DAG in the communication network.

In addition, FIG. 9 illustrates an example simplified sub-procedure 900 for reaching unreachable nodes of a grey zone, particularly with regard to an underestimated grey zone scope. In particular, sub-procedure 900 starts at step 905, and continues to step 910, where, as described in greater detail above, a DAG root node can send a redirected message toward one or more unreachable nodes of the sub-DAG by redirecting the message to a reachable adjacent node for controlled or limited distribution using a specified TTL parameter value. Next, as discussed above, in step 915 the DAG root node and/or the adjacent node determines that the redirected message cannot reach an intended destination (e.g., a particular unreachable node). For example, the redirected message may include a local timer parameter that starts a timer at the adjacent node, expiration of which may result in a determination that the redirected message cannot reach the intended destination. Next, in step 920, the TTL parameter of the redirected message is increased, yielding a second redirected message, which, in step 925 may be tunneled to the reachable adjacent node for distribution (unless, that is, the TTL is increased by the adjacent node itself). In some embodiments, the local timer parameter (specified in the redirected message) can also be increased. Notably, steps 915-925 can be iteratively repeated until the redirected message reaches an intended destination shown in step 930. Alternatively, a new adjacent node can be selected once the TTL parameter is increased beyond a threshold. Procedure 900 may then illustratively end in step 945.

Figure 10:
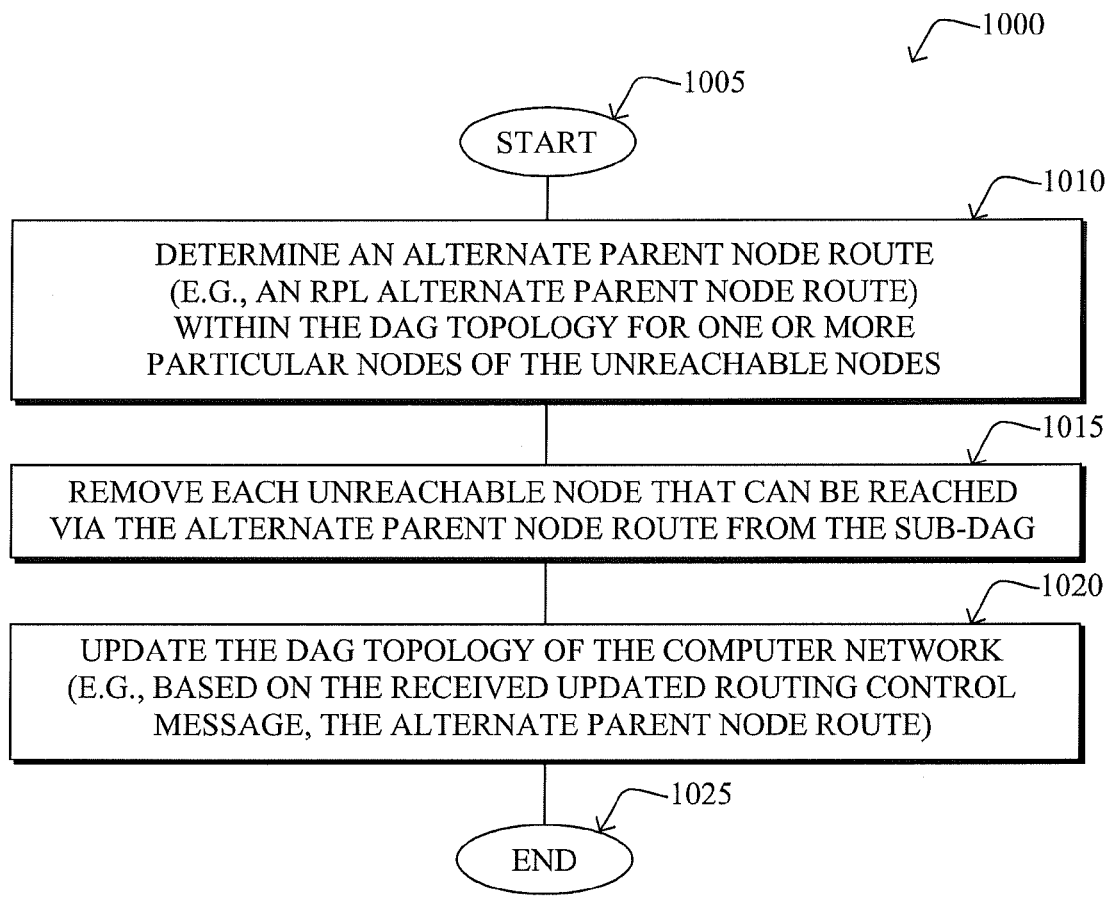

Moreover, FIG. 10 illustrates another example simplified sub-procedure 1000 for reaching unreachable nodes of a grey zone, particularly with regard to decreasing the scope of a grey zone through known route alternates. In particular, sub-procedure 1000 starts at step 1005, and continues to step 1010, where, as described in greater detail above, a DAG root can determine an alternate parent node route (e.g., a RPL alternate parent node route) within the DAG topology for the one or more unreachable nodes. Next, in step 1015, each unreachable node that can be reached via the alternate parent node is removed from the unreachable sub-DAG (from the grey zone), and in step 1020, the DAG root node can update the DAG topology based on the alternate parent node route. Procedure 1000 may then subsequently end in step 1020, which may further return to step 810 of FIG. 8 with a reduced number of unreachable nodes within the grey zone, accordingly.

It should be noted that while certain steps within procedures 800-1000 may be optional as described above, the steps shown in FIGS. 8-10 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 800-1000 are described separately, certain steps from each procedure may be incorporated into each other procedure, and the procedures are not meant to be mutually exclusive.

The techniques described herein, therefore, address the issue of grey zones within computer networks, such as due to the loss of DAO messages which can lead to unreachable nodes based on out-of-date routing information (e.g., "black holes"). In particular, the techniques herein provide for granular control to recover such unreachable nodes and increase overall network availability, without requiring additional control plane overhead.

While there have been shown and described illustrative embodiments that address the issue of grey zones within computer networks, it is to be understood that various other adaptations and modifications may be made within the spirit and scope of the embodiments herein. For example, the embodiments have been shown and described herein with relation to DAG networks. However, the embodiments in their broader sense are not as limited, and may, in fact, be used with other types of networks and/or protocols (e.g., wireless). In addition, while certain protocols are shown, such as RPL, other suitable protocols may be used, accordingly. Also, while the techniques generally describe initiation and determinations by a DAG root node, various other nodes may also be used to provide intelligence to the network functions described herein (e.g., non-root nodes, network management nodes, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
identifying, within a currently known directed acyclic graph (DAG) topology of a computer network, a sub-DAG of nodes that are unreachable, wherein the sub-DAG of unreachable nodes is a grey zone, the grey zone an area of the network where there is a lack of proper routing information to properly forward messages even though a feasible underlying path could exit;
determining a scope of the unreachable nodes of the sub-DAG;
tunneling a redirected message to a reachable node of the DAG topology that is adjacent to at least one of the unreachable nodes of the sub-DAG, the redirected message causing the reachable node to distribute the redirected message to one or more of the unreachable nodes of the sub-DAG based on the scope, wherein the redirected message has a time-to-live (TTL);
determining that the redirected message cannot reach a particular unreachable node of the one or more unreachable nodes;
increasing the TTL of the redirected message yielding a second redirected message; and
tunneling the second redirected message to the reachable node to cause the reach-able node to distribute the redirected message to the particular unreachable node with the increased TTL.

2. The method of claim 1, further comprising:
receiving an updated routing control message from one or more particular nodes of the one or more unreachable nodes that receives the redirected message; and
updating the DAG topology of the computer network based on the received updated routing control message.

3. The method of claim 1, wherein the redirected message is one of either a control message or a data message.

4. The method of claim 1, further comprising:
determining an alternate parent node route within the DAG topology for one or more particular nodes of the unreachable nodes;
removing each unreachable node that can be reached via the alternate patent node route from the sub-DAG; and
updating the DAG topology to reflect the alternate parent node route for each corresponding unreachable node.

5. The method of claim 1, further comprising:
comparing the increased TTL of the redirected message against a threshold; and
tunneling the redirected message having the increased TTL to the reachable node when the increased TTL is less than the threshold.

6. The method of claim 5, wherein the redirected message having the increased TTL is a probe message, the method further comprising:
tunneling the redirected message to a different reachable node of the DAG topology that is adjacent to the at least one of the unreachable nodes of the sub-DAG when the redirected message having the increased TTL is greater than the threshold.

7. The method of claim 1, wherein the redirected message causes the reachable node to distribute the redirected message via at least one of broadcasting or multicasting.

8. The method of claim 1, wherein the one or more nodes of the sub-DAG are nodes of the DAG topology sharing a same sub-root node that is unreachable by a root node of the DAG topology.

9. The method of claim 1, wherein determining the scope of the unreachable nodes of the sub-DAG further comprises:
correlating one or more received destination unreachable messages for the one or more unreachable nodes of the sub-DAG.

10. The method of claim 9, wherein the destination unreachable messages are internet control message protocol (ICMP) destination unreachable messages.

11. The method of claim 1, wherein determining the scope of the unreachable nodes of the sub-DAG further comprises:
sending connectivity verification messages to one or more nodes within the vicinity of the sub-DAG to determine which of the one or more nodes are unreachable.

12. The method of claim 1, wherein determining the scope of the unreachable nodes of the sub-DAG is based on knowledge of the DAG topology of a sub-root node of the sub-DAG.

13. The method of claim 1, wherein the identifying a sub-DAG of the one or more nodes that are unreachable is in response to receiving a particular number of retransmitted messages destined to one or more of the unreachable nodes of the sub-DAG.

14. An apparatus, comprising:
one or more network interfaces to communicate within a computer network;
a processor coupled to the network interfaces and adapted to execute one or more processes; and
a memory configured to store a process executable by the processor, the process when executed operable to:
identify, within a currently known directed acyclic graph (DAG) topology of a computer network, a sub-DAG of nodes that are unreachable, wherein the sub-DAG of unreachable nodes is a grey zone, the grey zone an area of the network where there is a lack of proper routing information to properly forward messages even though a feasible underlying path could exit;
determine a scope of the unreachable nodes of the sub-DAG;
tunnel a redirected message to a reachable node of the DAG topology that is adjacent to at least one of the unreachable nodes of the sub-DAG, the redirected message causing the reachable node to distribute the redirected message to one or more of the unreachable nodes of the sub-DAG based on the scope;
determine that the redirected message cannot reach a particular unreachable node of the one or more unreachable nodes;
increase the TTL of the redirected message yielding a second redirected message; and
tunnel the second redirected message to the reachable node to cause the reachable node to distribute the redirected message to the particular unreachable node with the increased TTL.

15. The apparatus as in claim 14, wherein the process when executed is further operable to:
receive an updated routing control message from one or more particular nodes of the one or more unreachable nodes that receives the redirected message; and
update the DAG topology of the computer network based on the received updated routing control message.

16. The apparatus as in claim 14, wherein the redirected message is one of either a control message or a data message.

17. The apparatus as in claim 14, wherein the process when executed is further operable to:
determine an alternate parent node route within the DAG topology for one or more particular nodes of the unreachable nodes;
remove each unreachable node that can be reached via the alternate patent node route from the sub-DAG; and
update the DAG topology to reflect the alternate parent node route for each corresponding unreachable node.

18. A tangible, non-transitory, computer-readable media having software encoded thereon, the software when executed by a processor operable to:
identify, within a currently known directed acyclic graph (DAG) topology of a computer network, a sub-DAG of nodes that are unreachable, wherein the sub-DAG of unreachable nodes is a grey zone, the grey zone an area of the network where there is a lack of proper routing information to properly forward messages even though a feasible underlying path could exit;
determine a scope of the unreachable nodes of the sub-DAG; and
tunnel a redirected message to a reachable node of the DAG topology that is adjacent to at least one of the unreachable nodes of the sub-DAG, the redirected message causes the reachable node to distribute the redirected message to one or more of the unreachable nodes of the sub-DAG based on the scope;
determine that the redirected message cannot reach a particular unreachable node of the one or more unreachable nodes;
increase the TTL of the redirected message yielding a second redirected message; and
tunnel the second redirected message to the reachable node to cause the reachable node to distribute the redirected message to the particular unreachable node with the increased TTL.

* * * * *